United States Patent

[11] 3,545,728

[72] Inventor Richard Schultz, Uzwil, Switzerland
[21] Appl. No. 752,310
[22] Filed Aug. 13, 1968
[45] Patented Dec. 8, 1970
[73] Assignee Gebruder Buhler AG Gall, Switzerland
[32] Priority Aug. 18, 1967
[33] Switzerland
[31] No. 11,669/67

[54] MIXING APPARATUS AND METHOD OF OPERATING SAME
12 Claims, 3 Drawing Figs.
[52] U.S. Cl. .................................................. 259/10, 259/46, 259/178
[51] Int. Cl. .................................................. B01f 7/02

[50] Field of Search ........................................... 259/46, 45, 9, 10, 25, 26, 109, 110, 169, 170, 178, 161, 162, 163

[56] References Cited
UNITED STATES PATENTS
| | | | |
|---|---|---|---|
| 2,145,428 | 1/1939 | Motta............................. | 259/46 |
| 2,544,202 | 3/1951 | Warner.......................... | 259/169 |
| 2,596,672 | 5/1952 | Gard.............................. | 259/10 |

Primary Examiner—Robert W. Jenkins
Attorney—McGlew and Toren

ABSTRACT: A mixer for the batch or charge mixing of plural components has at least one mixer shaft rotating in a mixer trough and provided with mixing tools. The mixer shaft is rotated at a first relatively low speed during mixing of the components and, during at least the latter part of the discharge of the mixture, is rotated at a very substantially higher speed.

3,545,728

MIXING APPARATUS AND METHOD OF OPERATING SAME

BACKGROUND OF THE INVENTION

In a mixing process generally known as batch mixing, mixtures of different components are provided by a mixer. The components are charged into the mixer in a certain amount, mixed as a batch and discharged again as the final mixture. This batch mixing is effected by a batch mixer, and an extremely complete evacuation of the mixer is required particularly in view of variations of the composition of the individual components to be mixed. Depending on the type of material components used for a particular mixture, the latter will have different flow properties in discharge from the mixer.

Thus, it is known that both the so-called concentrated feed mixtures and various mixtures in the chemical industry frequently have poor flow properties. In addition, special so-called trace elements, which are present in the mixtures in a very fine distribution, play a different role in each mixture. Such trace elements must be added in varying amounts, depending on the intended use. In particular, mixers in the concentrated feed industries and in chemical industries must meet very high requirements regarding the residual discharge capacities, so that one mixture is not impaired by undischarged residual deposits of a preceding mixture.

As a solution to the problem of residual discharge, or discharge residue, it has already been suggested to feed a gas under pressure through the mixture shaft individually to nozzles arranged in the mixing tools, in order to blow out the mixer trough with this gas under pressure and during the discharge of the mixer. This cleaning method has the advantage that the zones of the mixer trough within the range of the nozzles are well cleaned, but it has the disadvantage that the mixer trough remains covered with a residue of the mixer material at all points or areas not contacted by the current of gas under pressure.

SUMMARY OF THE INVENTION

This invention relates to the batch mixing of several materials or components in a batch mixer and, more particularly, to an improved method of operating the batch mixer and to improved apparatus for operating the batch mixer.

In accordance with the invention the above mentioned disadvantages with respect to complete evacuation of a batch mixer are avoided, in accordance with the invention method, by driving the mixer shaft mounting the mixing tools during the mixing process at a first speed per unit of time, and driving the shaft, during the discharge of the batch mixer, at a second speed per unit of time and which is higher than the first speed.

A batch mixer for mixing several components in a self-contained mixing process comprises, in accordance with the invention, at least one mixer shaft rotating in a mixer trough and provided with mixer tools, the mixer trough being provided with at least one selectively closable discharge opening and the mixer shaft having at least one driving unit coupled thereto. The driving unit has selectively operable first means for driving the mixer shaft at a first speed per unit of time, or a first velocity, during the mixing process, and selectively operable second means for driving the mixer shaft at a higher speed per unit of time, or higher velocity, during discharge of the batch mixer.

As a feature of the invention, first and second driving units are provided as a means for driving the mixer shaft.

In accordance with another feature of the invention, an overrunning clutch is interposed between the first driving unit and the mixer shaft, with a second driving unit being in direct driving connection with the mixer shaft. In accordance with the invention, the driving units may comprise various embodiments, and the invention also includes special procedural or method steps, special designs of apparatus, and special uses.

In addition, the present invention is directed to the use of the mixer for mixing primarily components ranging from granular to powdered and batch charged into the mixer, and also relates to the subsequent complete discharge of the mixture as a batch.

An object of the invention is to provide an improved method of operating a batch mixer for mixing several different components or ingredients.

Another object of the invention is to provide improved batch mixing apparatus for the batch mixing of several components or ingredients.

A further object of the invention is to provide a novel method and apparatus whereby a batch mixer may be completely evacuated at the end of a mixing operation.

Another object of the invention is to provide such a method in which the tool carrying shaft of a batch mixer is driven at a first relatively low angular velocity during the actual mixing operation and is driven at a substantially higher angular velocity during at least the latter portion of the mixture discharge phase.

A further object of the invention is to provide a batch mixer including driving means operable to rotate a mixer shaft, carrying mixer tools, at a first relatively low angular velocity during the actual mixing of the ingredients and at a second and much higher angular velocity during at least the latter part of the mixture discharge phase.

For an understanding of the principles of the invention, reference is made to the following description of typical embodiments thereof as illustrated in the accompanying drawings.

DESCRIPTION OF THE PREFERRED EMBODIMENTS

Figure 1:
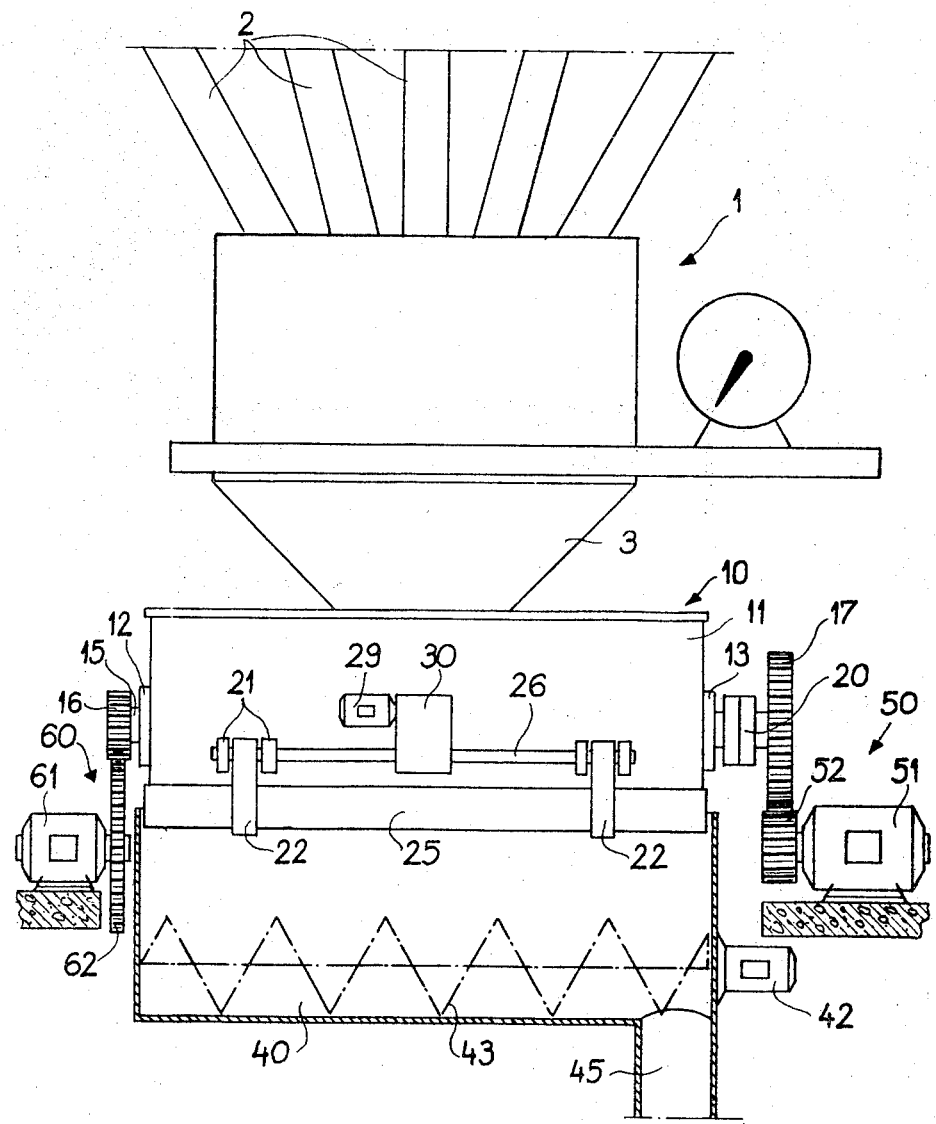
FIG. 1 is an elevation view, partly in section, of one form of mixer for performing the method of the invention.

Referring first to FIG. 1, separate feeding lines 2, for the respective components or ingredients of a mixture to be batch mixed, lead into a batch balance 1. A hopper 3 is arranged beneath the balance 1 and is associated with a batch mixer generally indicated at 10. A mixer trough 11, forming part of mixer 10, has bearings 12 and 13 at opposite sides or ends thereof, and these bearings rotatably support a mixer shaft 15. A pinion 16 is secured on one end of shaft 15, and a driving gear 17 is secured on the other end thereof. An overrunning clutch 20 is interposed between drive gear 17 and shaft 15.

Bearings 21 on trough 11 pivotally support a swingable bottom closing flap or door 25, through the medium of arms 22 secured to a shaft 26. To operate flap or door 25, shaft 26 is driven by a motor 29 through a reduction gear 30. Beneath mixer 10, there is arranged a discharge trough 40 provided with a discharge worm 43 driven by a motor 42, and trough 40 has an outlet 45.

A first driving unit 50 is coupled with driving gear 17 and comprises a driving motor 51 driving a pinion 52 meshing with gear 17. A second driving unit 60 is coupled with pinion 16, and comprises a motor 61 driving a gear 62 meshing with pinion 16. All the mentioned devices are supported in a known manner on foundations, similar to the representation of the supports for the driving motors 51 and 61.

Figure 2:
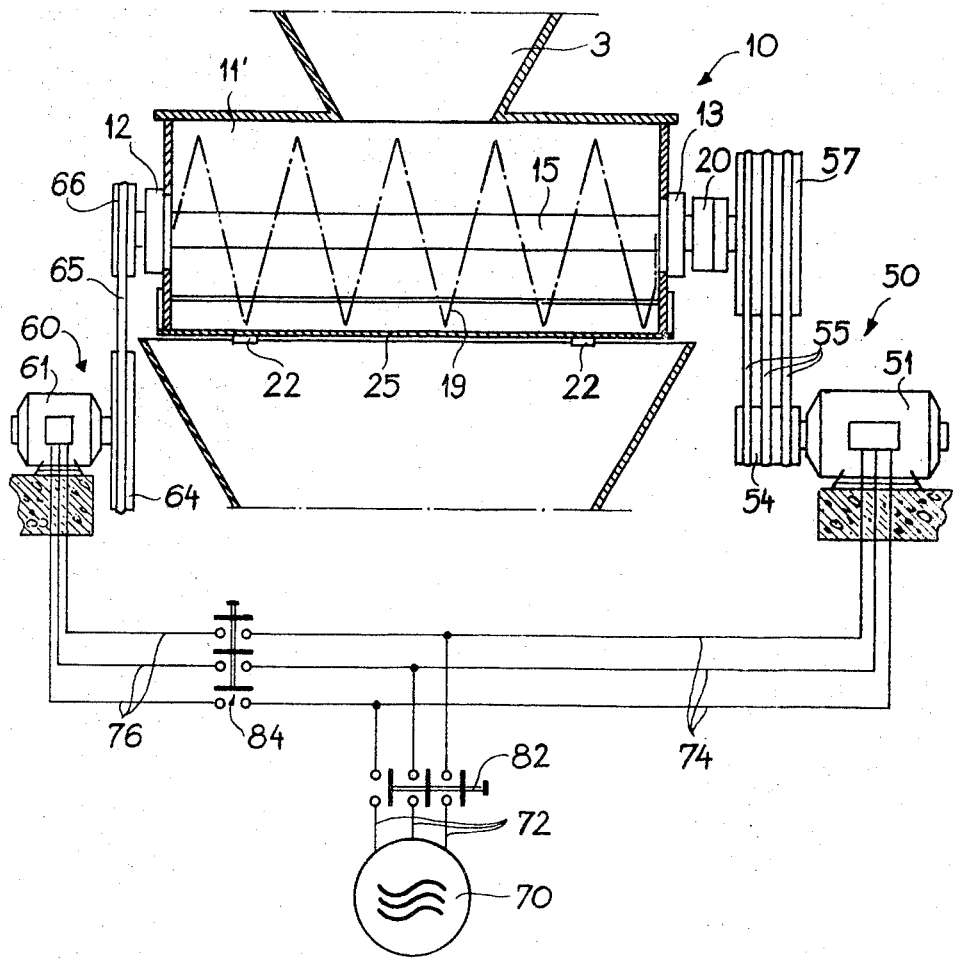
FIG. 2 is a longitudinal sectional view, with controls being shown schematically, of another form of mixer for performing the method of the invention.

While FIG. 1 shows the essential discharge elements of the mixer, FIG. 2 shows the driving system actually used. As a variant to the two driving means shown in FIG. 1, V-belt drives preferably are used in the embodiment of the invention shown in FIG. 2. For this purpose, motor 51 has a drive pulley 54 which drives a driven pulley 57 connected by an overrunning clutch 20 to shaft 15, the two pulleys being interconnected by V-belts 55. In a similar manner, driving motor 61 has a driving pulley 64 connected by a V-belt 65 with a V-belt pulley 66 secured on mixer shaft 15.

Conductors 72 extend from a source of a.c. potential 70 to a main switch 82, and conductors 74 connect switch 82 to driving motor 51. A second switch 84 is provided, being interposed between conductors 74 and conductors 76 connected to driving motor 61.

The components to be mixed preferably arrive at the batch mixer after having been dosed or weighted. In the majority of cases, the mixer shaft 15 carrying the mixing tools can be driven, even during filling of the batch mixer 10, at a first speed per unit of time or first angular velocity. This first velocity thus serves for carrying out the mixing process, which later requires a certain length of time. After the mixing process has been completed, discharge of batch mixer 10 is initiated, generally by opening the bottom flap 25. However, since discharge with conventional means is not satisfactory, in that it leaves a residue of material in the mixer, mixer shaft 15 is driven, during the discharge period, at a second speed per unit of time or second velocity which is higher than the first velocity.

There are two possible arrangements. A single driving unit can be so designed that it can be switched from the first velocity to the second velocity, or the mixer shaft 15 can be connected by an overrunning clutch with the driving unit for the first velocity and a second driving unit can be provided for the second and higher velocity, the second driving unit being in direct driving connection with mixer shaft 15. Overrunning clutch 20 works in a manner similar to a freewheel drive, wherein it is possible to have, on one side the clutch, a higher speed without the speed being influenced by a different speed being applied to the other side of the clutch. Such overrunning clutches are generally known and are commercially available. After completion of discharge, the second higher velocity drive is disconnected or deenergized. Thereupon, it tends to decelerate and, after a certain time, is carried along by the first drive having the lower or smaller velocity. The discharged material is fed to another processing state.

The apparatus represented in FIGS. 1 and 2 is suitable for performing the method of the invention. Upon closing the main switch 82, driving motor 51 is energized from polyphase a.c. source 70 through multiple conductors 72 and 74. Through pulley 54, belts 55 and pulley 57 motor 51 drives the mixer shaft 15 through overrunning clutch 20, in the arrangement of FIG. 2. In the arrangement of FIG. 1, the shaft 15, carrying the mixing tools 19 is driven, through overrunning clutch 20, but motor 51 through pinion 52 and driving gear 17.

The components to be mixed arrive in balance 1 through the feed elements 2, such as the down pipes 2 shown in FIG. 1. From balance 1, the feed elements are fed through feed hopper 3 to the batch mixer 10 for the self-contained mixing process. The desired mixing of the individual components or ingredients is effected while mixer shaft 15, carrying mixing tools 19, is driven at the first and lower angular velocity. After completion of the mixing process, discharge motor 29 is energized by switching means which have not been shown. Through reduction gear 30, motor 29 rotates shaft 26 to open discharge flap or door 25 connected to shaft 26 through the arms 22. The evacuation of the batch mixer is thus initiated and, during the discharge of the mixture, shaft 25 is rotated at the second and higher angular velocity by energizing driving motor 61 to drive pinion 16 and shaft 15 through driving gear 62, in the arrangement of FIG. 1. In arrangement of FIG. 2, driving motor 61 is energized by closure of switch 84, and through multiple conductors 76, to rotate driving pulley 64 and thus to rotate driven pulley 66 and shaft 15 through the medium of belt 65. The rotation of shaft 15, carrying the mixing tools 19, at the second and much higher angular velocity insures a substantially complete evacuation of the mixer 10. During driving of the shaft 15 by motor 61, the overrunning clutch 20 permits the gear 17 to be continuously driven without effecting the rotation of shaft 15 by motor 61. After completion of the discharge, motor 29 is operated to rotate shaft 26, mounted in bearings 21, to close flap or door 25 through the medium of arms 22, and switch 84 is opened so that, after a certain time, the angular velocity of mixer shaft 13, carrying mixing tools 19, is reduced to the first and lower angular velocity corresponding to operation by the motor 51.

As best seen in FIG. 1, the mixed material or mixture arrives in collecting trough 40 having a discharge worm 43 driven by a motor 42. Worm 43 moves the material along trough 40 to which the discharged outlet 45, from the discharge material is fed to another processing stage (storage, pressing, bag filling, etc).

The substantially improved residual discharge resulting from the invention method of operating the batch mixer is based on the fact that due to the much higher speed of the mixing tools during discharge of the mixture, air eddies break off on the trailing sides thereof, and these effect a detachment of the mixture particles adhering to the surfaces of the mixer. However, since batch mixers in many cases have mixing tools covering practically without interruption the entire length of the mixer trough, this method of residual discharge acts on all of the mixer wall zones. It will be understood that the higher discharge speed of the mixer shaft 15 can be started at any time during evacuation of the mixer trough, either at the start of the opening of the discharge flap or door 25 or a certain time following such opening.

The arrangement shown in FIGS. 1 and 2 represent a simple design of apparatus for performing the method of the invention. These arrangements are particularly of interest in all new construction, since the entire control expenditure is very low and, by virtue of the use of the overrunning clutch 20, the provision of various locking circuits is obviated. By contrast, in certain alterations or in order to meet special operating requirements, it may be desirable to provide only one driving motor for the mixer and to operate this motor by a special control. An arrangement of this type is shown in FIG. 3.

Figure 3:
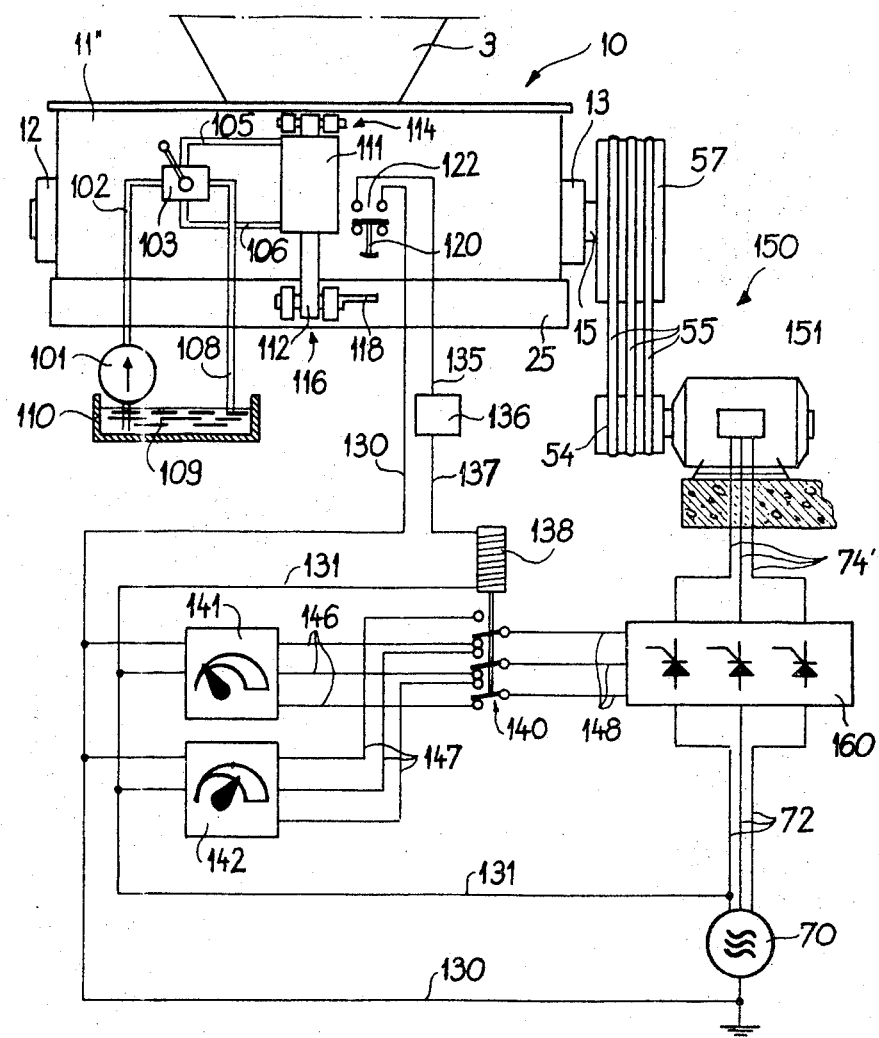
FIG. 3 is a part schematic and part side elevation view of still another form of mixer in accordance with the invention, illustrating the controls thereof.

Referring to FIG. 3, the batch mixer 10 is associated with a feed hopper 3 and comprises the mixer trough 11 having the two bearings 12 and 13 rotatably supporting the mixer shaft 15 having the driving pulley 57 thereon. A drive unit 150 is coupled with shaft driving pulley 57, and comprises a commutator motor 151 having an output pulley 54 connected to driving pulley 57 by V-belts 55. In this case, the closing flap or door of batch mixer 10 is provided with a hydraulic system comprising a pump 101 connected by a pressure line 102 to a reversing valve 103. Control lines 105 and 106 connect valve 103 to hydraulic cylinder 111, and a tank line or return line 108 connects the valve 103 to a tank 110 containing the hydraulic medium 109. The inlet of pump 101 communicates with tank 109.

Hydraulic cylinder 111 is supported on trough 11″ at 114, and a piston rod 112, connected with a piston (not shown) in cylinder 111, is connected with flap or door 25 by a hinge or pivoting connection 116. A control switch 120 is mounted on mixer 10 and is a reversing switch having contacts 122. In the open position of flap or door 25, switch 122 is reversed by a control plate 118 on door or flap 25. One contact of the working contacts 122 is connected by a line 130 with the grounded side of a polyphase a.c. potential source 70, while the other contact of the working pair is connected by a line 135 to a timing element 136. A conductor 137 connects timing element 136 to one end of the operating coil 138 of a reversing switch 140, and a line 131 connects the opposite end of winding 138 to one of the output conductors of source 70.

Three conductors 72 connect source 70 to a control device 160 comprising controllable rectifiers. Commutator motor 151 of driving unit 150 is connected by three conductors 74′ to control device 160. In addition to operating coil 138, a first speed setting device 141 and a second speed setting device 142 are connected to lines 130 and 131. First speed setting device 141 controls the angular velocity of shaft 15 during the mixing process, and the second speed setting device 142 provides the second or higher angular velocity for shaft 15 during discharge of the batch mixer. Devices 141 and 142 are connected by respective conductors 146 and 147 to respective contacts of reversing switch 140, and conductors 148 connect reverse switch 140 to control device 160.

The apparatus illustrated in FIG. 3, for performing the method of the invention, works in the following manner. In the illustrated position of all control elements, the batch mixer is set for mixing process. Independence on the setting of the speed setting device 141, for the bias control of the controllable rectifiers and control device 160, commutator motor 151 of driving unit 150 runs at a certain first relatively low speed. Motor 151 thus drives mixer shaft 15 at a first relatively low angular velocity, through the medium of pulley 54, V-belts 55, and driving pulley 57. The motor speed can be set by the phase gating control, which is a known procedure. The generation of the control pulses necessary for the three phases is effected, for each speed, in the respective setting devices 141 and 142.

After the ingredients have been thoroughly mixed, the entire mixed batch is discharged. This is effected by switching the reversing valve 103. Responsive to such switching of valve 103, piston rod 112 is moved upwardly by the piston in hydraulic cylinder 111, flap or discharge gate 25 is opened and, in the final open position thereof, control switch 120 is actuated by control plate 118. This results in exitation of operating coil 138, with a predetermined time delay, through timing element 136. When coil 138 is energized, reversing switch 140 is reversed, disconnecting speed setting device 141 from control device 160 and connecting speed setting device 142 to control device 160. Speed setting device 142 is set to operate control device 160 to provide a substantially higher second operating speed to commutator motor 151, energized from polyphase a.c. source 70. Motor 151 thus accelerates to the higher second speed. As a result, the mixer shaft is rotated at a substantially higher angular velocity and effects a better residual discharge.

After the discharge, hydraulic reversing valve 103 is reversed again to the position illustrated in the drawing. Piston rod 112 is moved downwardly relative to hydraulic cylinder 111 to close flap or discharge door 25 of batch mixer 10. Control switch 120, being thereby disengaged by control plate 118, opens and disconnects operating coil 138 from the voltage source. Thus, reversing switch 140 is reversed to the position illustrated in the drawing to reconnect speed setting device 141 with control device 160 and to disconnect speed setting device 142 from control device 60. Control device 60 is thus set for the initial relatively low first speed of motor 51, and the motor 51 decelerates to this speed. Batch mixer 10 can be refilled with material or ingredients to be mixed, through the hopper 3, so that a new mixing operation is initiated.

The machine of FIG. 3 is characterized in that both the lower speed range, for the mixing process, and the higher speed range, for the residual discharge, can be readily adapted to the properties of the materials. Existing mixers can be easily so changed that the new method for operating the mixer can be readily applied.

Other arrangements for carrying out the method, particularly with respect to the driving of the mixer, are readily possible within the scope of the invention. Thus, hydraulic or pneumatic driving units may be of advantage in certain cases, since with these it is only necessary to adjust pressure setting valves or hydraulic volume governors in the feed line to the driving element.

Mixers for performing the method of the invention are particularly suitable for the preparation of mixtures of individual components in batches for the production of feeds, foods, etc., as well as for the production of chemical inorganic or organic mixtures of bases, semifinished products, or end products. The complete evacuation of the batch mixer for mixing different components which are enriched with trace elements, frequently in extreme mixing ratios of 1:1000 or 1:10000 (trace element to remaining mixture components) is of major importance and is made possible by the invention method as well as the apparatus for performing this method.

I claim:

1. A method of operating a batch mixer, of the type operable to mix plural mixture components in a self-contained mixing phase and then to discharge the mixture, and of the type having at least one rotatable mixer shaft carrying mixing tools rotatable in a mixer trough, said method comprising, during mixing of the components to form a mixture, rotating the mixture shaft at a first preselected angular velocity; discharging the mixture simultaneously along substantially the entire length of the trough; and, during discharge of the mixture, rotating the mixer shaft at a second preselected angular velocity which is substantially higher than the first preselected angular velocity and sufficiently high to generate air eddies at the trailing sides of the mixing tools to air sweep substantially the entire inner surface of the trough.

2. A method of operating a batch mixer, of the type operable to mix plural mixture components in a self-contained mixing phase and then to discharge the mixture, and of the type having at least one rotatable mixer shaft carrying mixing tools rotatable in a mixer trough, said method comprising, during mixing of the components to form a mixture, rotating the mixture shaft at a first preselected angular velocity; and, during discharge of the mixture, rotating the mixer shaft at a second preselected angular velocity which is substantially higher than the first preselected angular velocity; the mixer shaft being rotated at said second preselected angular velocity after the mixer has been half evacuated.

3. A method of operating a batch mixer, of the type operable to mix plural mixture components in a self-contained mixing phase and then to discharge the mixture, and of the type having at least one rotatable mixer shaft carrying mixing tools rotatable in a mixer trough, said method comprising, during mixing of the components to form a mixture, rotating the mixture shaft at a first preselected angular velocity; and, during discharge of the mixture, rotating the mixer shaft at a second preselected angular velocity which is substantially higher than the first preselected angular velocity; and including the steps of, during the first part of the discharge of the mixture, rotating the mixer shaft at the first preselected angular velocity; and thereafter completing the discharge while rotating the mixer shaft at the second preselected angular velocity.

4. In a batch mixer of the type operable to mix plural mixture components in a self-contained mixing phase and then to discharge the mixture, and having at least one rotatable mixer shaft carrying mixing tools rotatable in a mixer trough having at least one discharge opening and means to close each opening, and having driving means for the mixer shaft, the cross-sectional area swept by the mixing tools being only very slightly less than the cross sectional area of the trough interior, the improvement comprising, in combination, selectively operable first means, in said driving means, operable to rotate said mixer shaft at a first angular velocity during mixing of the components to form a mixture; and selectively operable second means in said driving means, operable to rotate said mixer shaft at a second and substantially higher angular velocity during discharge of the mixture and sufficiently high to generate air eddies at the railing sides of the mixing tools to air sweep substantially the entire inner surface of the trough.

5. In a batch mixer, the improvement claimed in claim 4, in which said selectively operable first means comprises a first driving unit operatively associated with said mixer shaft; said selectively operable second means comprising a second unit operatively associated with said mixer shaft.

6. In a batch mixer, the improvement claimed in claim 4, in which said selectively operable first and second means comprises an a.c. driving motor; and an infinitely variable electronic control connecting said a.c. driving motor to a source of a.c. potential.

7. In a batch mixer of the type operable to mix plural mixture components in a self-contained mixing phase and then to discharge the mixture, and having at least one rotatable mixer shaft carrying mixing tools rotatable in a mixer trough having at least one discharge opening and means to close each opening, and having driving means for the mixer shaft, the improvement comprising, in combination, selectively operable first means, in said driving means, operable to rotate said mixer shaft at a first angular velocity during mixing of the components to form a mixture; and selectively operable second means in said driving means, operable to rotate said mixer shaft at a second and substantially higher angular velocity during discharge of the mixture; said selectively operable first means comprising a first driving unit operatively associated with said mixer shaft; said selectively operable second means comprising a second unit operatively associated with said mixer shaft; and an overrunning clutch interposed between said first driving unit and said mixer shaft; said second driving unit being in direct driving connection with said mixer shaft.

8. In a batch mixer, the improvement claimed in claim 7, in which said first driving unit remains connected to said mixer shaft during rotation of said mixer shaft by said second driving unit at said second preselected angular velocity and is overrun by said second driving unit through said overrunning clutch.

9. In a batch mixer of the type operable to mix plural mixture components in a self-contained mixing phase and then to discharge the mixutre, and having at least one rotatable mixer shaft carrying mixing tools rotatable in a mixer trough having at least one discharge opening and means to close each opening, and having driving means for the mixer shaft, the improvement comprising, in combination, selectively operable first means, in said driving means, operable to rotate said mixer shaft at a first angular velocity during mixing of the components to form a mixture; and selectively operable second means in said driving means, operable to rotate said mixer shaft at a second and substantially higher angular velocity during discharge of the mixture; said mixer trough being a horizontally oriented oblong trough having said mixer shaft rotatably mounted therein and provided with an upper feed opening and said discharge opening at the lower portion; said selectively operable first means comprising a first driving unit; and an overrunning clutch connecting said first driving unit to one end of said mixer shaft; said second selectively operable means comprising a second driving unit in direct connection with the opposite end of said mixer shaft.

10. In a batch mixer of the type operable to mix plural mixture components in a self-contained mixing phase and then to discharge the mixture, and having at least one rotatable mixer shaft carrying mixing tools rotatable in a mixer trough having at least one discharge opening and means to close each opening, and having driving means for the mixer shaft, the improvement comprising, in combination, selectively operable first means, in said driving means, operable to rotate said mixer shaft at a first angular velocity during mixing of the components to form a mixture; and selectively operable second means in said driving means, operable to rotate said mixer shaft at a second and substantially higher angular velocity during discharge of the mixture; said selectively operable first and second means comprising a changeable pole driving unit and a pole changing control operatively associated with said changeable pole driving unit.

11. In a batch mixer of the type operable to mix plural mixture components in a self-contained mixing phase and to discharge the mixture, and having at least one rotatable mixer shaft carrying mixing tools rotatable in a mixer trough having at least one discharge opening and means to close each opening, and having driving means for the mixer shaft, the improvement comprising, in combination, selectively operable first means, in said driving means, operable to rotate said mixer shaft at a first angular velocity during mixing of the components to form a mixture; and selectively operable second means in said driving means, operable to rotate said mixer shaft at a second and substantially higher angular velocity during discharge of the mixture; said selectively operable first and second means comprising a pressure medium operated driving unit operatively connected to said mixer shaft; and a pressure medium control means operatively associated with said pressure medium driving unit.

12. In a batch mixer of the type operable to mix plural mixture components in a self-contained mixing phase and then to discharge the mixture, and having at least one rotatable mixer shaft carrying mixing tools rotatable in a mixer trough having at least one discharge opening and means to close each opening, and having driving means for the mixer shaft, the improvement comprising, in combination, selectively operable first means, in said driving means, operable to rotate said mixer shaft at a first angular velocity during mixing of the components to form a mixture; and selectively operable second means in said driving means, operable to rotate said mixer shaft at a second and substantially higher angular velocity during discharge of the mixture; said selectively operable first means comprising a first driving unit operatively associated with said mixer shaft; said selectively operable second means comprising a second unit operatively associated with said mixer shaft; said second driving unit rotating idly during rotation of said mixer shaft by said first driving unit at said first preselected angular velocity.